United States Patent [19]

Taylor et al.

[11] Patent Number: 4,495,302

[45] Date of Patent: Jan. 22, 1985

[54] CERAMICS COMPACT

[75] Inventors: Derek Taylor, Congleton; Stephen P. Howlett, Macclesfield; Howard J. Farr, Gnosall; Barbara L. Tickle, Stone, all of England

[73] Assignee: Doulton Industrial Products Limited, Staffordshire, England

[21] Appl. No.: 517,400

[22] Filed: Jul. 26, 1983

[30] Foreign Application Priority Data

Jul. 28, 1982 [GB] United Kingdom ................. 8221855

[51] Int. Cl.³ ............................................. C04B 35/44
[52] U.S. Cl. .................................... 501/125; 501/153; 423/600
[58] Field of Search ................. 501/125, 153; 423/600

[56] References Cited

U.S. PATENT DOCUMENTS 2,017,723 10/1935 McKinley et al. ................... 501/125
2,120,338 6/1938 McDougal et al. ................. 501/153

FOREIGN PATENT DOCUMENTS 0134710 12/1974 Japan ................................... 501/125

OTHER PUBLICATIONS

Refractories Bibliography, Am. Iron & Steel Inst. and The Am. Cer. Soc., Inc., Columbus, Ohio, 1950, Items 1182, d-g.

Primary Examiner—James Poer
Attorney, Agent, or Firm—Cushman, Darby & Cushman

[57] ABSTRACT

A fired ceramics compact for use in casting of a super alloy material consisting of a solid solution of BaO and $Al_2O_3$ wherein the composition of the solid solution lies on or between a first and a second eutectic composition, the first and the second eutectic compositions being adjacent and occurring to either respective side of stoichiometric $BaO.Al_2O_3$ in a phase diagram of the solid solution.

13 Claims, 2 Drawing Figures

CERAMICS COMPACT

This invention relates to a ceramics compact suitable for use in the casting of superalloy materials.

The production of turbine blades, and other metallic components designed to operate at high temperatures, has led to considerable research effort into alloys having high melting temperatures and into specialised casting technology for dealing with such alloys. There are two types of alloy commonly used in the industry; superalloys with melting points in the range 1500°–1650° C. and advanced superalloys (or eutectic alloys) with melting points of 1700° C. and above. A particular problem encountered in the production of turbine blades is the design necessity for a void, often of complex geometry, within each cast turbine blade. This void is an essential feature of a high pressure turbine blade as it allows for cooling of the blade. It is well known to produce such blades by a process which involves casting the requisite alloy about a ceramics core. The core may be removed subsequently by mechanical means or by leaching with a suitable solvent. Clearly the ceramics core plays an important role in the casting process and it is such cores which are primarily the concern of the present invention.

It is also known to cast a turbine blade as a pair of complementary blade halves which may subsequently be welded together. (Aviation Week and Space Technology, Dec. 3rd, 1979). The blade halves are cast in a mould comprising two cavities separated by a ceramics divider. The divider, or strongback may be removed after cooling without the need for leaching.

In order to be useful as a core material a ceramics material must conform to certain physical criteria. It must be dimensionally and thermally stable. It must not react to a significant extent with the molten alloy or form an excessively thick interface compound between the core and the cast alloy. It must be sufficiently strong to withstand the casting process but compressible enough to prevent hot tearing of the cast alloy as the alloy contracts upon cooling. It must be readily removable from the casting. In most cases this last condition is satisfied by providing a caustic soluble ceramics material of high porosity, which porosity allows a suitable liquid solvent to permeate into the core. This condition is not a prerequisite for a strongback.

A further problem is sintering at high temperatures which not only effects the physical properties of the core but reduces significantly the apparent porosity of the core. A ramification of sintering is that reduced porosity causes major difficulties in the removal of core material subsequent to casting.

It is known to use fused silica or fused silica/zircon compositions as cores and moulds for the casting of alloys melting up to and around 1500° C. Above this temperature such compositions exhibit physical characteristics which render them of limited use. In particular the mechanical integrity of a silica core is reduced as the melting point of silica (about 1700° C.) is approached. At such temperatures undesirable reactions may be evident with the component metals of the alloy.

In European Specification EP-A1-0001434 there are described a number of alumina based ceramics useful for the manufacture of casting cores. The specification is directed towards ceramics capable of withstanding the conditions necessary for casting directionally solidified eutectic alloys and directionally solidified superalloy materials. That is, ceramics which satisfy the criteria mentioned above at temperatures near 1800° C. Useful alumina based ceramics disclosed are $Na_2O.9Al_2O_3$-$Na_2O.11Al_2O_3$; $CaO.6Al_2O_3$; $SrO.6Al_2O_3$ and $BaO.6Al_2O_3$. These ceramics all possess a $\beta$-alumina structure.

There remains however a distinct need in the industry for a high stability, non reactive ceramics material for use as cores, strongbacks and moulds in the normal casting of superalloy materials.

The structure and physical properties of mixed oxide systems containing BaO, CaO or SrO and $Al_2O_3$ have been the subject of academic study. (See for example, "The Structural Behaviour of the Nepheline Family: 1) Sr and Ba aluminates ($MAl_2O_4$ "Mineralogical Magazine" 45 1982 pages 111–127). We have now discovered that such materials may be used to produce fired ceramics compacts suitable for use in the casting of superalloy materials. Compacts produced with the materials exhibit a surprisingly low level of sintering which results in a relatively high apparent porosity and consequently facilitates removal of the core by leaching.

According to the present invention we provide a fired ceramics compact suitable for use in casting of a superalloy material wherein the ceramics compact comprises a ceramic material comprising a solid solution of at least $BaO.Al_2O_3$ wherein the composition of the solid solution lies on or between a first and a second eutectic composition, the first and second eutectic compositions being adjacent and occurring to either respective side of stoichometric $BaO.Al_2O_3$ in a phase diagram of the solid solution.

The phase diagram of the $BaO.Al_2O_3$ system is published in Phase Diagrams for Ceramists ed. E. M. Levin, R. Robbins, H. S. McMureie, published by American Ceramics Society, at page 97.

In this specification the term 'compact' is to be taken to mean an article formed by moulding of the ceramics material described. In particular the compact is a core, strongback or mould. We have found that a mixture of BaO and $Al_2O_3$ in a composition between eutectic points of the $BaO.Al_2O_3$ phase system is particularly useful as a core, strongback or mould composition for the casting of superalloys, preferably using the techniques of directional solidification (DS) or single crystal casting.

Preferably the ceramics compact comprises a ceramics material having from 38 weight percent to 76.5 weight percent BaO and from 62 weight percent to 23.5 weight percent $Al_2O_3$. More preferably the ceramics compact comprises a ceramics material having from 40 weight percent to 70 weight percent BaO and from 60 weight percent to 30 weight percent $Al_2O_3$. Most preferably the ceramics compact comprises a ceramics material having about 60 weight percent BaO and about 40 weight percent $Al_2O_3$. Ceramics materials to be used in the invention fall to be considered as $BaO.Al_2O_3$ although the stoichiometric composition is strictly only one embodiment of the invention. The phase of the $BaO.Al_2O_3$ solution defined above exists as a Tridymite structure. (Tridymite is one of the crystalline modifications of silica).

Preferably the ceramics compact is produced by firing the ceramics material at a temperature of 1450° C. to 1750° C. and preferably 1600° C. to 1700° C. Preferably the ceramics material is fired for 10 minutes to 10 hours. Most preferably the ceramics material is fired at 1640° C. to 1660° C. for from 3 to 6 hours. Preferably the ceramics material has a particle size of less than 1,000 μm. The particle size of the ceramics material is largely dependent upon the size and complexity of the ceramics compact made from that material. For example a small compact shape will require a ceramics material of a lower particle size than will be required for a large plain shaped article. Preferably the ceramics compact has an apparent porosity of 10 to 50 percent. The term "apparent porosity" is widely used in the ceramics art and is defined in BS1902. Preferably the ceramics compact has a crossbreaking strength at room temperature of 100 to 8,000 p.s.i. and more preferably 3,000 to 5,000 p.s.i.

The method of production of ceramics compacts according to the present invention is standard and will be immediately apparent to the skilled addressee. Any compound of barium or aluminium may be used as a starting material provided that the use of the compound results in the appropriate oxide entering the solid solution during the firing of the ceramic material. Suitable compounds include nitrates and oxalates with carbonates being particularly preferred.

Refractory oxides may be added to the ceramics material, for example alumina, zirconia, calcia, strontia, etc. A mixed oxide for example mullite may also be added.

We now describe some embodiments of the present invention. The description describes the preparation and properties of ceramics compacts comprising BaO.$Al_2O_3$. However, it will be apparent to the man skilled in the art that the procedures described are equally applicable to the preparation of ceramics compacts comprising CaO.$Al_2O_3$ or SrO.$Al_2O_3$.

The description refers to the accompanying drawings in which.

EXAMPLE 1

Reagent grades of barium carbonate $BaCO_3$ (Vine Chemicals Limited) and alumina hydrate $Al(OH)_3$ (British Aluminium Company) were taken in the ratio of 1 part by weight $BaCO_3$ to 0.788 parts of $Al(OH)_3$. The materials were mechanically mixed using a ball mill and a charge of high alumina media. When completely mixed the compounded powder was subsequently calcined to pre-form the BaO.$Al_2O_3$ solid solution. The calcination was at 1200° C. with a 4 hour hold at peak temperature. The phase composition was checked using X-ray diffraction. The resulting powder was then melted by electro fusion to form a solid BaO.$Al_2O_3$ "ingot". The electro fused material was subsequently comminuted to the required particle size distribution by a combination of techniques. Firstly jaw crushing produced a material with particles in the range 1 mm–5 mm, and secondly dry ball milling in a cylindrical mill for 118 hours with pure alumina grinding media. An anti-caking agent was used to prevent agglomeration.

The material was then sieved and separated into various size grades. All sieve sizes refer to British Standard Mesh sizes, namely:

+60 mesh
−60+150 mesh
−150+300 mesh
−300 mesh

Depending on the size and geometry of the articles to be fabricated, various amounts of the above size fractions can be mixed to give the desired rheological properties. The powder was mixed in a Z blade type mixer with a thermoplastic wax based binder system to form a material suitable for injection moulding.

Test bar samples 175 mm×12 mm×4 mm were injection moulded and fired. The samples were fired at an increasing temperature of 25°/hr up to the 300° C. necessary to remove the wax binder and were subsequently gas fired to the peak sintering temperature. The physical properties of the test bars were investigated as a function of peak firing temperature. The physical propoerties are summarized in the following table.

| Peak Firing Temperature °C. for 4 hour hold | Cross Breaking Strength lb. lb.in$^{-2}$ | apparent porosity % | Linear Shrinkage % |
| --- | --- | --- | --- |
| 1450 | 255 | 39.0 | +0.15 |
| 1550 | 432 | 39.6 | +0.05 |
| 1650 | 2103 | 33.0 | −2.07 |
| 1700 | 7000 | 15.0 | −8.5 |

EXAMPLE 2

The process for example 1 was repeated except that 5 weight % of the barium aluminate powder used to formulate the moulding compound was replaced by −300's B.S. mesh fused alumina. Test bar samples were fabricated by injection moulding. The properties of the material after firing to a peak temperature of 1650° C. for 4 hours were:

Cross breaking strength: 2300 lb.in$^{-2}$
Apparent Porosity: 32.0%
Linear Shrinkage: 2.3%

EXAMPLE 3

The process for example 1 was repeated except that 10% by weight of the barium aluminate in the moulding compound was replaced with −300's B.S. mesh fused alumina. Test samples were injection moulded and fired at 1650° C. for a hold of 4 hours.

EXAMPLE 4

Figure 1:
FIG. 1 is a scanning electron micrograph of a fracture surface of barium aluminate fired to a peak temperature of 1650° C.
Figure 2:
FIG. 2 is a scanning electron micrograph of a pure alumina material after firing to a peak temperature of 1650° C.

A typical scanning electron micrograph of a fracture surface of barium aluminate fired to a peak temperature of 1650° C. for 4 hours hold is shown in FIG. 1. For comparison FIG. 2 shows a micrograph of a pure alumina material for the same firing conditions.

FIG. 1 shows the very open structure of the BaO.$Al_2O_3$ composition and the very clearly defined hexagonal crystal habit of the Ba.$Al_2O_3$. In comparison the alumina materials in FIG. 2 has a microstructure characteristic of the initial stages of the sintering with the grain boundary necks clearly visible on the grain surfaces. The barium aluminate material generates the hexagonal crystal habit at the expense of sintering. Consequently, the BaO.$Al_2O_3$ material forms a compact with a very low degree of sintering and hence a low shrinkage and a high degree of crushability, which are both desirable properties for preformed cores.

EXAMPLE 5

The process for example 1 was followed except that 'race track' samples with dimensions 1.5"×0.029"×0.039" were fabricated by injection moulding. The fired preformed cores were used as for single crystal castings. Removal of the cores using a high pressure autoclave and NaOH or KOH solution shared a typical leaching rate of 2.9 mm/hr. Similar cores in pure alumina gave a leaching rate of 0.9 mm/hr.

EXAMPLE 6

The process for example 1 was followed except that after the initial mixing the compounded $BaCO_3$ and $Al(OH)_3$ is calcined to 1550° C. for 2 hours hold at peak temperature. The material was then ground in a ball mill using high alumina grinding media. The ground material was then blended using a Z-blade type mixer with a wax based binder system to form an injection moulding compound. Test bar samples were fabricated and fired to the preferred schedule, and found suitable for preformed core materials.

The above Examples describe embodiments of the present invention which were fired at between 1450° C. and 1700° C. for a period of 4 hours. Similar experiments, in which compacts were fired for a period of 5 hours, were performed. The compacts produced had slightly improved physical properties.

What we claim is:

1. A fired ceramics compact suitable for use in casting of a superalloy material wherein the ceramics compact consists essentially of a ceramics material consisting of a solid solution of BaO and $Al_2O_3$ wherein the composition of the solid solution lies on or between a first and a second eutectic composition, the first and the second eutectic compositions being adjacent and occurring to either respective side of stoichometric $BaO.Al_2O_3$ in a phase diagram of the solid solution.

2. A ceramics compact according to claim 1 wherein the ceramics material contains from 38 to 76.5 weight % BaO and from 62 to 23.5 weight % $Al_2O_3$.

3. A ceramics compact according to claim 2 wherein the ceramics material contains from 40 to 70 weight % BaO and from 60 to 30 weight % $Al_2O_3$.

4. A ceramics compact according to claim 1 wherein the ceramics material contains about 60 weight % BaO and about 40 weight % $Al_2O_3$.

5. A ceramics compact according to claim 1 wherein a ceramics material is fired at a temperature from 1450° C. to 1750° C.

6. A ceramics compact according to claim 5 wherein the ceramics material is fired at a temperature of from 1600° C. to 1700° C.

7. A ceramics compact according to claim 1 wherein the ceramics material is fired for 20 minutes to 10 hours.

8. A ceramics compact according to claim 1 wherein the ceramics material is fired at temperature from 1640° C. to 1660° C. for from 3 to 6 hours.

9. A ceramics compact according to claim 1 wherein the ceramics material has a particle size of less than 1000 $\mu$.

10. A ceramics compact according to claim 1 wherein the ceramics compact has an apparent porosity of 10-50%.

11. A ceramics compact according to claim 1 wherein the ceramics compact has a crossbreaking strength at room temperature of 100 to 8000 p.s.i.

12. A ceramics compact according to claim 1 wherein the ceramics compact has a crossbreaking strength at room temperature of 3000 to 5000 p.s.i.

13. A ceramic compact according to claim 1 consisting of the solid solution of BaO and $Al_2O_3$.

* * * * *